Figure 1:
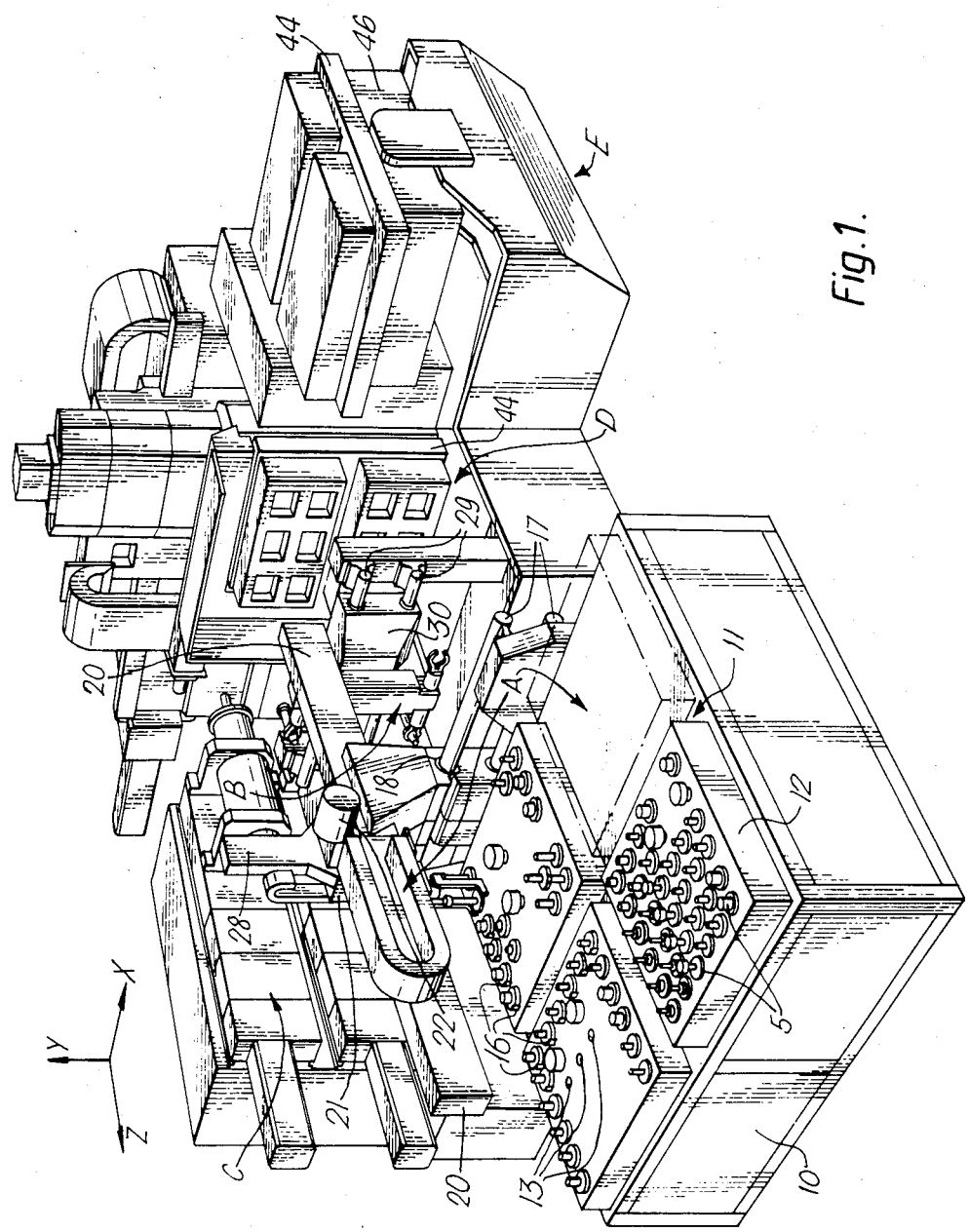

United States Patent [19]

Bayes et al.

[11] Patent Number: 4,654,954
[45] Date of Patent: Apr. 7, 1987

[54] MACHINE TOOLS

[75] Inventors: Michael G. Bayes, Wolverhampton; Walter Coulthard, Preston, both of United Kingdom

[73] Assignees: British Aerospace Public Limited Company, London; Marwin Production Machines Limited, Wednesfield, both of England

[21] Appl. No.: 660,133

[22] Filed: Oct. 12, 1984

[30] Foreign Application Priority Data

Oct. 13, 1983 [GB] United Kingdom ................. 8327437

[51] Int. Cl.$^4$ ............................................. B23Q 3/157
[52] U.S. Cl. ........................................ 29/568; 211/1.5
[58] Field of Search ..................... 29/568, 26 A, 26 R; 279/1.75; 211/1.5; 414/751, 783

[56] References Cited

U.S. PATENT DOCUMENTS

| | | | |
|---|---|---|---|
| 3,951,273 | 4/1976 | de Caussin | 901/6 |
| 4,042,122 | 8/1977 | Epsy et al. | 414/783 |
| 4,110,898 | 9/1978 | Yamaoka et al. | 29/568 |
| 4,164,809 | 8/1979 | Tsuboi et al. | 29/568 |
| 4,359,815 | 11/1982 | Toyoda | 29/568 |

FOREIGN PATENT DOCUMENTS

| | | | |
|---|---|---|---|
| 3023539 | 1/1982 | Fed. Rep. of Germany | 29/568 |
| 3022717 | 1/1982 | Fed. Rep. of Germany | 29/568 |
| 2120965 | 12/1983 | United Kingdom | 29/27 C |

Primary Examiner—William R. Briggs
Attorney, Agent, or Firm—Cushman, Darby & Cushman

[57] ABSTRACT

A tool handling system for tools 5 of the type having a machining portion and a common base portion 9 (e.g. an international taper) for being engaged by the drive spindle of a workhead, said system being adapted for storing said tools and for moving a selected tool to a transfer station, the system including tool storage means comprising a close-packed generally planar array of tool store locations 13, each adapted to receive the base portion of a tool with its machining portion directed upwardly and tool selector means for moving over said tool storage means and for gripping a selected tool and moving it vertically out of its location, then to a transfer station.

7 Claims, 9 Drawing Figures

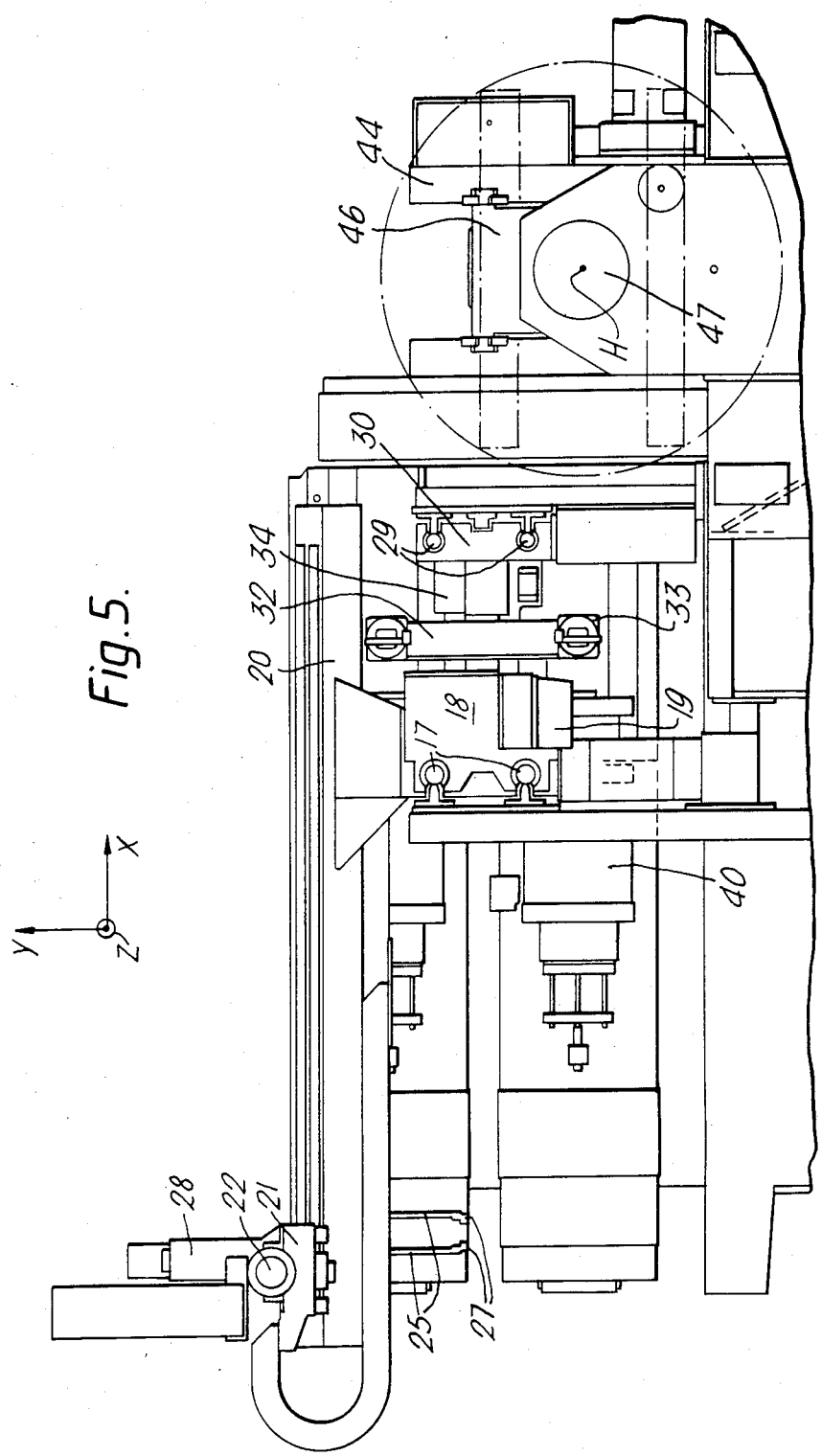

MACHINE TOOLS

This invention relates to machine tools which include a tool handling arrangement and in particular, though not exclusively to tool selection and storage arrangements for flexible manufacturing systems.

In one known arrangement, the tools for a series of machining operations are releasably located about the periphery of a circular carousel member which is rotatably mounted adjacent the machine and which is indexed to present the appropriate tool to the tool changer mechanism of the machine. This arrangement however allows only a small number of tools to be stored for a given plan area of the carousel, since the maximum number of tools which may be stored is dictated by the circumferential length of the carousel and the manoeuvring region to either side of each tool. Typically, 20 tools may be accommodated in such an arrangement. The carousel itself is also adapted for use with a particular machine and is not readily replaceable by a carousel adapted for use with a different machine.

In another arrangement, the tools are stored in rows, with their base portions pointing upwardly, each tool being supported by a U-shaped lateral support. This arrangement however requires that the tool be withdrawn laterally from the store, which means that a relatively large gap should be provided between adjacent rows to allow a tool gripping mechanism to move between the rows and to remove or replace a tool from its support.

According to one aspect of this invention, there is provided a tool handling system for tools of the type having a machining portion and a common base portion (e.g. an international taper) for being engaged by the drive spindle of a workhead said system being adapted for storing said tools and for moving a selected tool to a transfer station, said system including:

(i) tool storage means comprising a close-packed generally planar array of tool store locations, each adapted to receive the base portion of a tool with its machining portion directed generally upwardly, and (ii) tool selector means for moving over said tool storage means and for gripping a selected tool and moving it vertically out of its location thence to said transfer station.

Preferably, means are provided to maintain each tool in a predetermined angular orientation.

Preferably, said tool storage means comprises a rectangular array of tool store locations.

Preferably, said tool selector means includes a carriage which is preprogrammable to move in X-Y manner between a position adjacent said transfer station and a predetermined tool store location. The carriage conveniently includes a tool gripper mechanism movable in a direction generally perpendicular to the movement of said carriage.

The tool gripper mechanism preferably includes a pair of gripping arms operable to grip a region of the base portion of a tool. It is convenient for the gripping arms each to be of L-form with the gripping portions located at the free ends of the shorter limbs of the arm to allow those tools having cutting portions of greater diameter than their associated flange to be gripped.

In another aspect of this invention, there is provided a tool handling system for storing tools and presenting them to the workhead of a machine tool, said system including a tool storage and selection system as hereinbefore defined in combination with tool change means adapted to move tools from said transfer station to a pick-up position for engagement by said workhead, said tool change means including a bogey member mounted for rotation about an axis and including two opposed tool clamp means, each operable to clamp a tool, the tool change means being operable to clamp a tool presented at said transfer station and to move it to a position adjacent said workhead in readiness for engagement thereby.

Figure 2:
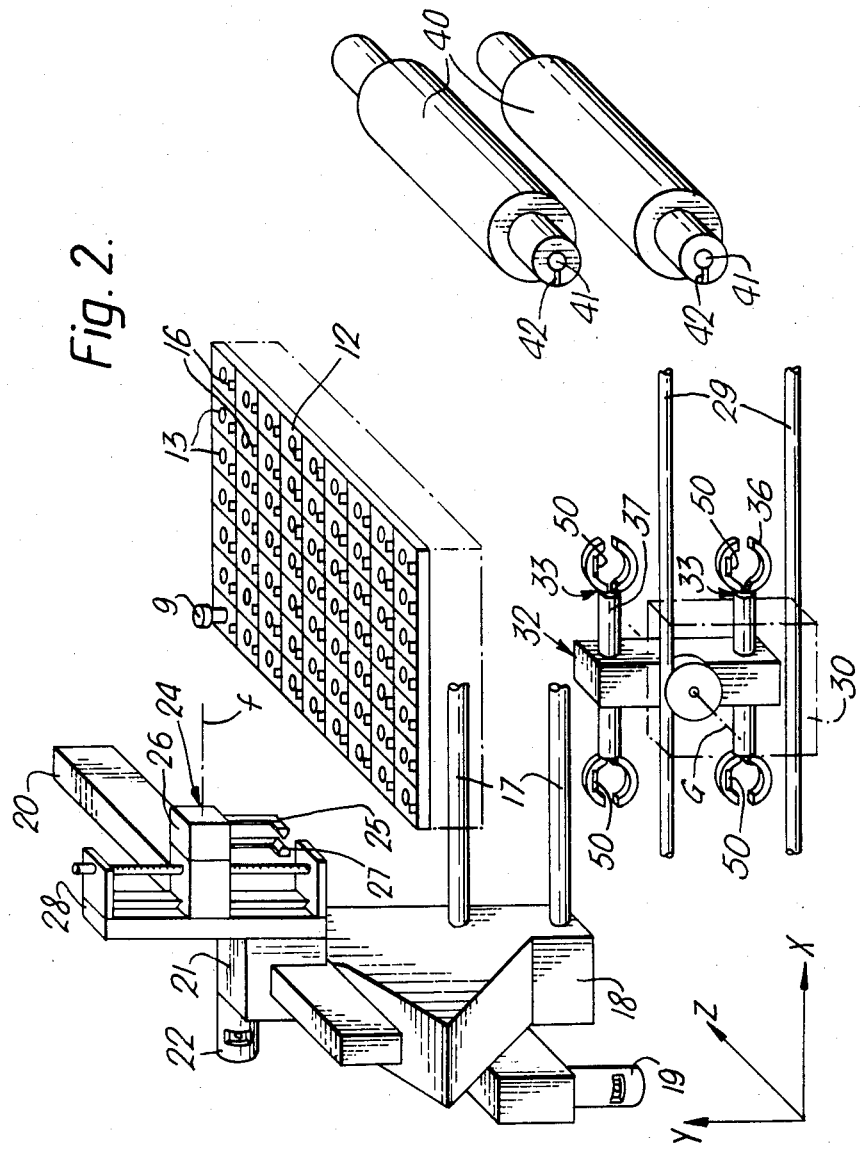
Figure 3:
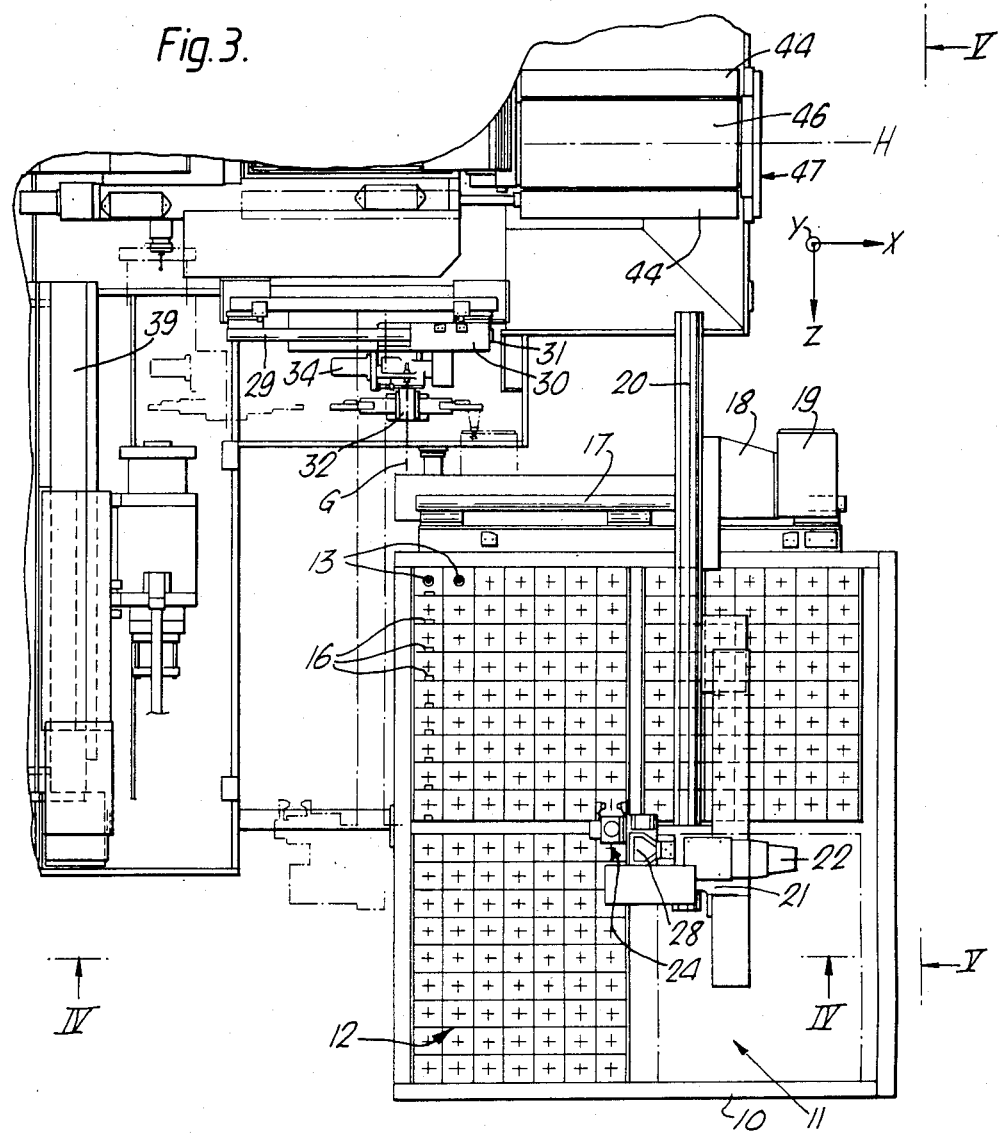
Figure 4:
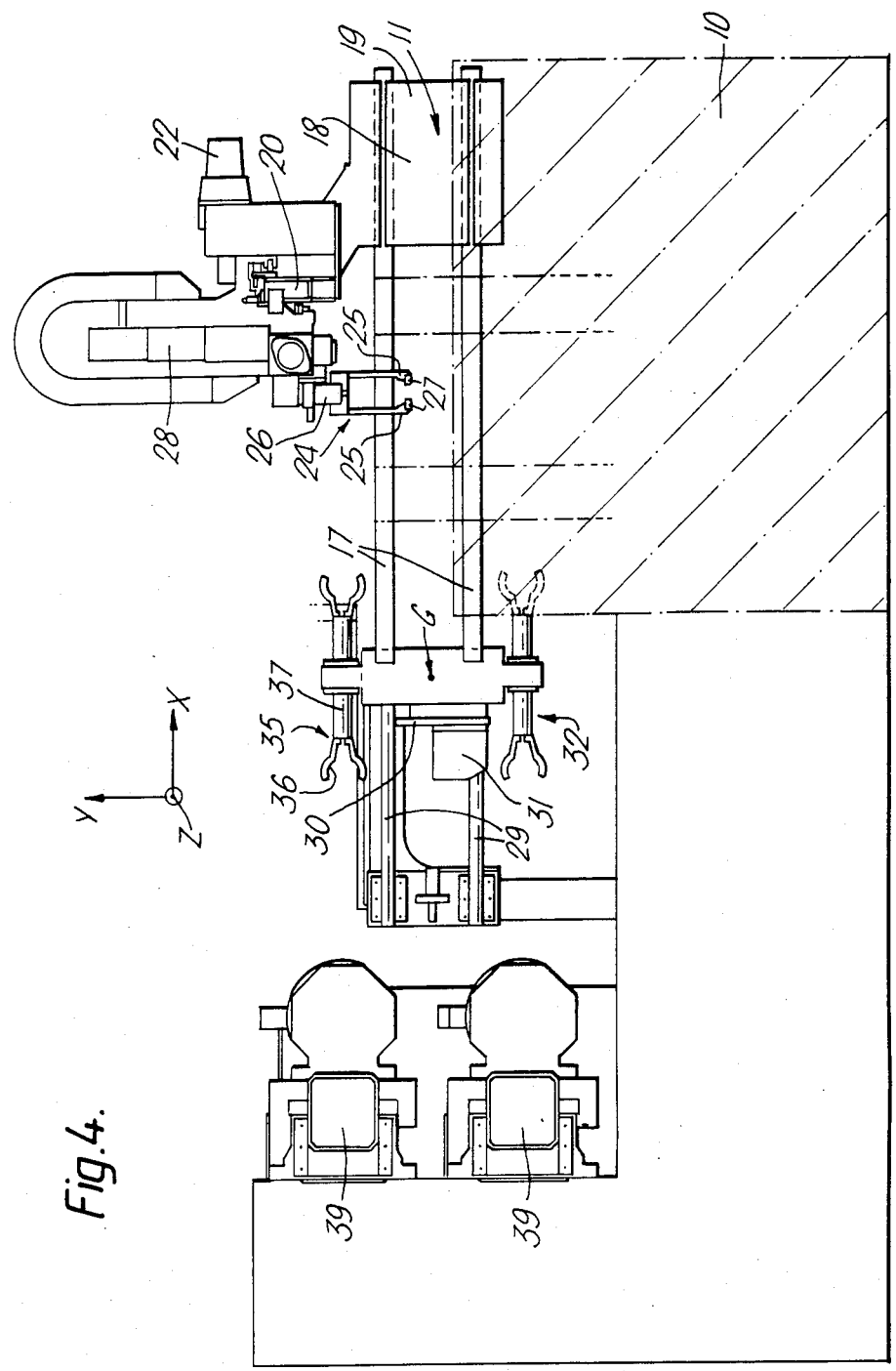
Figure 6A:
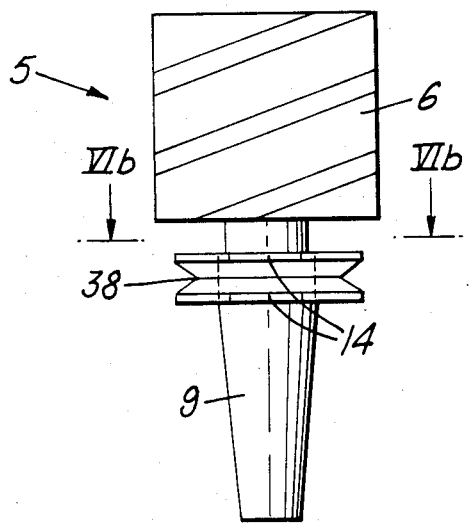
Figure 6B:
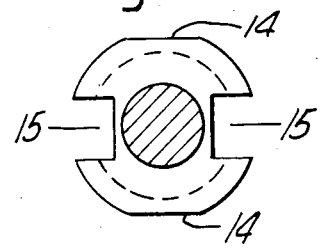
Figure 7:
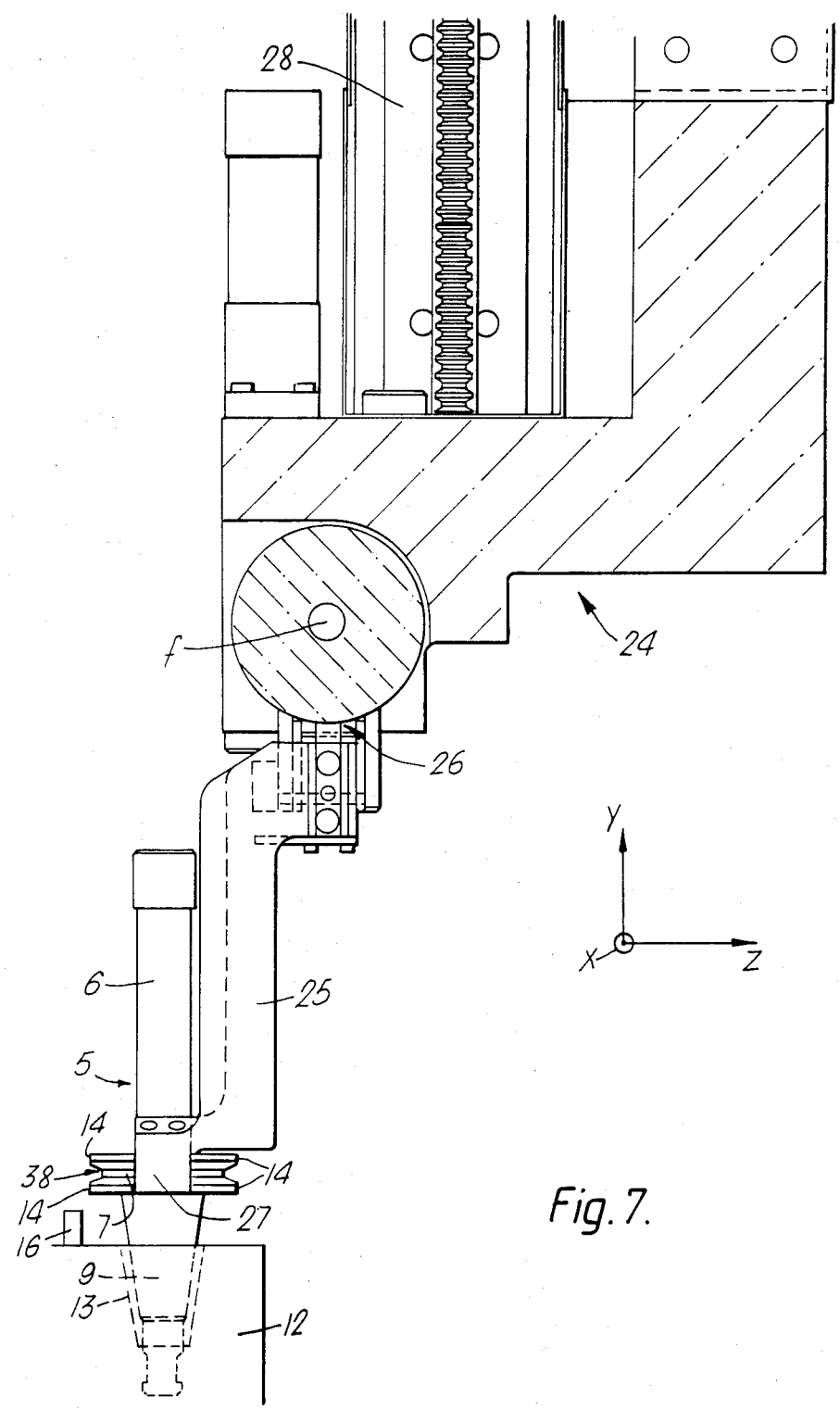

Further aspects of this invention will become apparent from the following description, which is by way of example only, reference being made to the accompanying drawings, in which:

FIG. 1 is an isometric view of an embodiment of a machining cell incorporating features of this invention;

FIG. 2 is a schematic view showing elements of the tool selection and change mechanism employed in the embodiment of FIG. 1, FIG. 3 is a top plan view of part of the embodiment of FIG. 1, FIG. 4 is a front transverse view on arrows IV—IV of FIG. 3, with some parts removed for clarity, FIG. 5 is a side view on arrows V—V of FIG. 4 with some parts removed for clarity, FIGS. 6a and 6b are side and section views respectively of a typical tool, and FIG. 7 is a detail view of the tool gripping mechanism of the tool selector.

Figure 8:
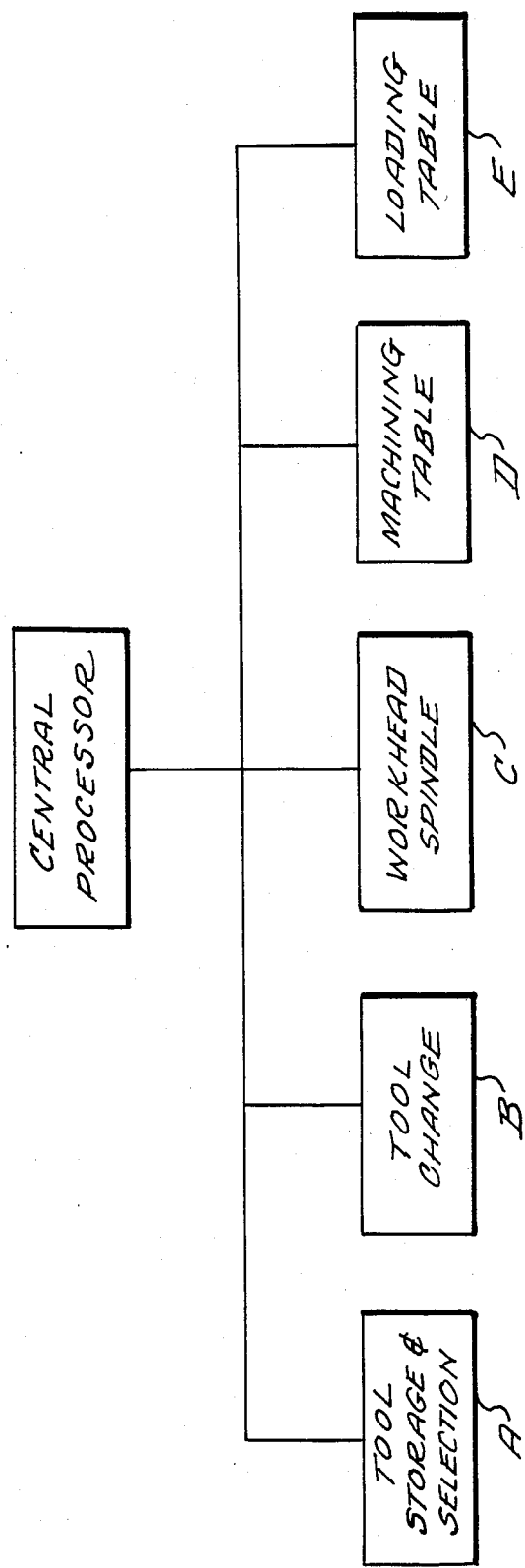

FIG. 8 is a block diagram depicting the control system of the machine cell shown in FIG. 1.

The embodiment of machining cell illustrated incorporates a twin horizontal spindle type machine tool which machines a pair of workpieces held one above the other in a vertical configuration. The horizontal spindle machines are each of the type having a chuck with a tapered bore and a lug adjacent the mouth of the bore and which receives tools of the type having a tapered end and an associated circumferential flange having a pair of opposed drive slots one of which is engaged by the lug. The workpieces are secured to a workpiece pallet for ease of handling before and after machining and the tools required for the machining housed in a special form of tool crate—to be described below—to allow sets of tools readily to be replaced without human operator intervention.

Referring to FIG. 8, the machining cell illustrated in the drawings may conveniently be thought of as comprising a number of interrelated modules under the control of a central processor, namely a tool storage and selection module A, a tool changing module B, a workhead spindle module C, a machining table module D and a loading table module E. For ease of description three orthogonal axis X,Y,Z will be defined as follows; the Z axis extends horizontally in a direction parallel to the rotational axis of the drive spindles, and away from the workpiece, the Y axis extends vertically upwardly, and the X axis extends horizontally from left to right as viewed in FIG. 1.

Referring initially to the tool storage and selection module A, this comprises a base 10 secured to ground and defining a horizontal storage area 11 which may support up to four tool crates 12. The tool storage area includes ball roller elements (not shown) and chain conveyor systems (not shown) which allow tool crates to be shunted into any of the four available positions and sensor means for determining the presence of a tool crate. The tool crates 12 are designed to receive and store tools 5 of the type comprising a base portion 9 adapted to be drivingly engaged by the drive spindle of a horizontal milling machine, and a cutting portion 6. The base portion of the tool is tapered and includes a drive flange 7 having a V-shaped groove 38 cut in its periphery. The flange is also provided with two diametrically opposed drive slots 15 and a pair of flats 14 disposed at 90° thereto. The tool crates 12 have defined in their upper surface a close packed rectangular array of identical tapered bores 13 adapted to receive the tapered spindle of a tool. For the purposes of uniform angular disposition of the tools in the arrays during storage, each tapered bore 13 has an adjacent upstanding abutment 16 which engages with one of the flats of a tool to maintain it in a desired angular position. The upper surface of the crates 12 conveniently is constituted by an array of moulded plastic elements each having a tapered bore and associated abutment, the array being held together by suitable side walls and a base.

Referring particularly to FIGS. 2 and 3, a pair of horizontal guide rails 17 each extending in the X-direction is supported to one side of the base 10 and slidably mounts for horizontal movement a tool selector block 18, which is movable along the rails 17 along the X direction by means of a motor 19 under the control of the central processor. A selector guide beam 20 extends transversely of the selector block 18 in the Z direction and supports a selector carriage 21 for movement therealong. Movement of the carriage in the Z direction is achieved by motor 22 and an associated rack and pinion mechanism under the influence of the central processor. The carriage 21 supports a vertical column 28 which mounts a tool gripping mechanism 24 for movement in the Y direction under the control of an associated motor (not shown) by means of a rack and pinion mechanism. The rack is replaceable with one of longer length should the size of the tools located in the tool crates make this necessary. The tool gripping mechanism may therefore be moved to any location in the X-Z directions over the selected tool crate under the control of the central processor. However, movement in the vertical, i.e. Y direction, operates on the bang-bang principle.

Referring to FIG. 7, the tool gripping mechanism 24 comprises a pair of space, L-shaped arms 25 (only one of which can be seen in the figure), the free ends of the longer limbs being attached to a gripping actuator 26 operable to move the arms between a gripping position in which the arms are parallel and a free position in which the arms are splayed. At the free end of each shorter limb, there is provided an inwardly projecting abutment 27 adapted to be received in a respective drive slot 15 of the tool 9 when the gripping actuator is in its clamped position.

The tool gripper mechanism is pivotted at its upper end for pivotal movement about an axis F extending in the X direction for 90° movement between a retracted/loading position in which the major portions of the arms extend in the Z direction and a selecting/replacing position (as seen in FIG. 7) in which the arms extend downwardly in the Y direction.

Referring again to FIG. 2 the tool changing module B comprises a pair of guide rails 29 secured to a fixed part of the machine tool structure and extending in the X direction on which is supported a tool changer carriage 30 for movement in the X direction, motor 31 being provided to effect such movement. A tool clamp device 32 comprising four tool clamps 33 arranged in back-to-back pairs in H formation is mounted for rotation about axis G which extends in the Z direction. Movement of the clamp device about axis G is achieved by motor 34. Each clamp comprises two clamp arms 35 having arcuate gripping portions 36 of V section, the clamp arms being movable between a clamping position and a splayed open position by means of actuator 37. The V-section gripping portions 36 are configured to be a complementary fit in the V-groove 38 provided in the flange of the tool 9. In addition, one of the gripping portions 36 has attached thereto a plate 50 defining a flat abutment surface which co-operates with the flat 14 provided on the flange of the tool 9 to maintain the tool in a desired angular position when clamped by the tool clamp 33. Furthermore, when a tool is clamped by gripping portions 36, there is sufficient clearance between the opposed end regions of the arcuate portions to allow the projecting abutments 27 to be introduced one into each gap subsequently to grip the drive slots 15 of the tool 9 when the tool is being transferred from the tool selector to the tool changer.

The horizontal level and vertical separation of the tool clamps 33 matches that of the spindles of the machine tool and thus no vertical movement of the tool change mechanism relative to the spindles is required during a tool replacement cycle. Moreover, when the tool gripping mechanism 24 is at its low level, the axis F about which it pivots is at the same horizontal level as the upper pair of clamps 33. This allows the tool gripping mechanism merely to move between a high level (for traversing the tool crate to the tool selector before or after gripping a tool) and a low level where it grips tool and having traversed to the tool selector, it returns to the same level to effect transfer of the tool. Thus, no intermediate level is required.

Referring now to the workhead assembly spindle module C, this comprises a pair of horizontal guide beams 39 extending in the Z direction and each mounting a machine tool drive spindle 40 and associated rotational drive means for linear movement in the Z direction. Each machine tool drive spindle 40 has a tapered bore 41 and an associated drive lug 42 which engages one of the drive slots 15 of the tool. As with the tool selector mechanism, the gripping portions 36 when gripping a tool have sufficient clearance therebetween to prevent the drive abutments of the workhead spindle from fouling the gripping portions during a transfer of tools.

Turning now to the machining table module D, this includes a support platen 43 arranged in the X-Y plane for movement in these directions by guides and motors (not shown). The platen 43 is provided with guide members and a traction ram (not shown) for drawing the workpiece pallet 44 from the load table when the latter is turned to locate a workpiece pallet in the X-Y plane, into secure engagement with the supporting platen.

Referring finally to the load table module E, this comprises a double sided base member 46 mounted for rotation about axis H between a position in which the loading surfaces are horizontal, to allow a workpiece pallet 44 to be slid on or off the uppermost surface, from or to a trolley, and a position in which the surfaces are located vertically, presenting one of the workpiece pallets 44 in readiness for being drawn onto the support platen. The base member is rotatably driven by means of indexing DC motor 47. The base member 46 includes guide means and releasable locking means (not shown) which engage complementary elements in the workpiece pallet to hold the pallet in the desired position and to allow it to be drawn onto or off the base in a predetermined direction.

An operating sequence for the above described machine detail will now be described.

(a) A workpiece pallet 44 to which is secured a pair of billets to be machined is loaded onto one side of the base member 46 and secured thereto.

(b) A tool crate 12 containing the appropriate tools 5 for the machining operations to be done is located at the selection area of the storage area 11 (top left-hand quadrant as viewed in FIG. 3), either manually or by means of the conveyor system acting on controls issued by the central processor.

(c) The central processor is loaded with data relating to the identity and location of each tool in the tool crate in the selection area. This step may be obviated if there is a standard layout in the tool crate, details of which are stored in the processor. Similarly, the processor is loaded with details of the machining operations to be performed.

(d) The base member 46 is rotated through 90° so that its upper surface is brought to lie in the X-Y plane, coplanar with the supporting surface of the platen 43. The locking means on the base member is released and the workpiece pallet 44 is drawn onto the platen member and secured thereto. The base member 46 can then be rotated through 90° either to remove a pallet having workpieces previously machined or to load a new pallet having two billets to be machined.

(e) Initially, the tool gripping mechanism 24 is located at its upper level at a datum position over the storage area with its gripping arms 25 arranged with their major portions horizontal. The central processor causes the tool gripping mechanism 24 to move to a position overlying a tool to be selected, but spaced a slight distance away in the Z direction. Whilst the tool gripping mechanism is still at its upper level the L-shaped arms 25 are then pivotted about F through 90°, and the mechanism is then moved to its lower level in the Y direction. The gripper actuator 26 is operated to open the arms 35 to their splayed position. At this stage, the abutments 27 are adjacent but spaced slightly in the Z direction from the drive slots 15 of the tool 9 to be selected. The tool gripping mechanism is then moved forwardly in the Z direction until the abutments are aligned with the drive slots of the tool and the gripper actuator operated so that the abutments 27 are urged into the drive slots 15 to grip the tool.

(f) The tool gripping mechanism 24 is then moved vertically (along the Y axis) to its upper level to draw the tool 9 out of the crate 12 and clear of the surrounding tools. The tool gripping mechanism is then caused to pivot through 90° so that the base portion of the tool points in the Z direction, and its machining portion points towards the load table E. The tool gripping mechanism 24 then traverses in the X and Z directions, and then back to the lower Y level, to lie in a transfer position adjacent the upper clamp 33 of the clamp device 32 which is nearest the spindles 40.

(g) Actuator 37 is operated to open the gripping portions 36 of the clamp 33 and tool gripping mechanism 24 inserts the tool transversely into the clamp and actuator closes the clamp so that the V-shaped gripping portions 36 are received in the V-shaped groove 38 provided in the flange 7 of the tool. The plate 50 located against one of the flats 14 of the tool to hold it in the required angular disposition. The tool gripping mechanism then releases the tool 9 and returns to its upper Y level.

(h) the tool gripping mechanism 24 then repeats step (e) to gather a second tool whilst the clamping device 32 rotates through 180°. The gripping mechanism then executes step (f) except that this time it returns to a transfer position which is adjacent the upper clamp 33 which is nearest the storage area, and step (g) is repeated. At this stage, the right-hand pair of clamps 33 as viewed in FIGS. 3 and 4 will be holding the selected tools. It is emphasized at this point that the loading of the right hand upper and lower clamps has been achieved without the need to move the tool gripping mechanism in the Y direction to any other position apart from the upper level—which is used merely for traversing manoeuvres—and the lower level at which the mechanism both picks out the tool and later transfers it to the clamping device. This is achieved by designing the tool gripping mechanism so that when at its lower level position, with the arms 25 located vertically, it is at the correct height to engage a tool stored in crate 12, and when the arms 25 lie horizontally, a tool clamped thereby is at the correct height for insertion into an upper clamp device 32. The high level of the tool gripping mechanism is thus required solely for ensuring that the mechanism, and any gripped tool, does not foul other tools in the array when the mechanism traverses in the X-Y directions.

(i) With the right side of clamp device 32 clamping tools and the left side empty, the clamp device is traversed along the X axis and then rotated through 180° so that the clamps clamping tools are adjacent the spindles 40. Simultaneously or prior to to the workheads are retracted to a loading/unloading position somewhat spaced from the clamped tools and each drive spindle is oriented so that its drive lug 42 lies at an angular position of 90° with respect to a vertical plane. This will normally be achieved by providing orientation means which ensure that each drive spindle 40 always stops at this configuration and providing a releasable brake for maintaining the workheads in this orientation when they are stationary. The spindles 40 are then advanced in the Z direction to engage the tools with the drive lug 42 locating in one of the drive slots 15 of each tool. The clamps 33 are then released and the clamp device 32 returns to present the clamps 33 at their transfer station. Machining of the workpieces may now commence, relative movement of the workpiece with respect to the drive spindle 40 being effected in the X and Y directions by movement of the platen support, and movement in the Z direction being effected by movement of the spindle itself.

(j) Step (i) assumes that the workhead spindles are initially empty. If this were not so, then prior to rotation of the clamp device 33 through 180° and retraction of the drive spindles, the empty clamps would clamp the tools already in the drive spindles. Subsequently, these tools would be released from the spindles and the spindles then retracted in the Z direction. Step (i) would then continue but when the tool clamp device 32 returned to adjacent the storage area, it would contain two tools. These would be returned to their respective, preprogrammed locations in the craft 12 by a reverse of the operations of steps (e), (f) and (g).

(k) Whilst the particular machining operations are being carried out with the selected tools in the workhead spindles, the pair of tools required for the next machining operation are selected and placed in a pair of clamps 33 of the clamp device 32 according to steps (e), (f), (g) and (h), for exchange with the tools in the workhead spindles when the particular machining operation has been completed.

(l) These steps are repeated until the required machining operations have been performed on the workpieces. The drive spindles 40 are then retracted, the base member 46 then rotated through 90° to present an unoccupied worksurface adjacent the platen support 43. The locking means locking the workpiece pallet 44 is then released to allow the workpiece pallet to be shunted onto the base member 46 where it is locked. The base member may then be rotated through 180° to present a fresh workpiece pallet 44 in readiness to be drawn onto the platen support 43. The base member 46 is then rotated through 90° so that the pallet with the workpieces which have been machined is inverted to allow swarf to drop into a swarf collector and also to allow the workpieces to be washed. The base member is then rotated through 180° to present the pallet uppermost for subsequent release and shunting onto a trolley for delivery to a further workstation or store.

It is preferred for the workpiece pallet and the tool crate to be of the same plane dimensions and for the storage area for the crates and the upper surface of the base member when horizontal to be at the same height, so that tool crates and workpiece pallets can be loaded and unloaded at their respective locations by the same trolley. The trolley may be movable manually or it may be an automatically guided vehicle which draws crates/pallets from their location and then delivers them elsewhere.

Referring to the tool storage crates 12, these are designed to receive the common base portions of the tools, that is to say the tapered shaft, and thus so long as the diamter of the cutting portion of the tool is within a predetermined limit (typically 3" diameter) all tools can be received in the crate without making allowance for variation in length and diameter. The tools are withdrawn vertically and thus the tools can be much closer packed than previously since there is no requirement for lateral movement of the tool in the vicinity of the crate. In the embodiment described the crates define a 7×9 array of locations within a plan area of 680 mm×605 mm. In addition, when a human operator is involved in dealing with the tool crates, he may readily identify tools in the array since their characteristic cutting portions protrude from the array and thus are easily visible.

Since the crates allow a close packed array of tools in a rectangular plan form, the crates themselves may easily be handled as compared to existing carousel-type stores of circular form; in the illustrated embodiment 3 crates of tools each containing up to 63 tools are available on the storage area for being shunted into the selection area.

In carousel type machines, different machines will require different forms of carousel; thus loading and refurbishing of tools for a group of machines is not readily achievable automatically since each carousel needs to be handled differently. The tool storage and selection system described above may however be used instead of the carousel storage so that the group of machines even though originally designed to use a number of different carousels can employ a common tool storage system. One of the principle advantages which accrue from this is that a uniform tool crate may be used for each of the different machines. This allows tool inspection and refurbishing to be carried out automatically, the crates being transferred from the machine tool to the inspection areas by automatically guided vehicles.

We claim:

1. A tool handling system for handling tools of the type having a machining portion and a common base portion for being drivably engaged in a rotatable drive spindle of a workhead, said system being programmable to select a predetermined tool from storage and to more it to a transfer station, said system including:
    (i) a generally horizontal support platform;
    (ii) tool storage means movably supported on said support platform and comprising a tool crate having an upper surface region defining a generally horizontal close-packed rectangular array of tool storage apertures each adapted to receive the base portion of a tool with its machining portion pointing upwardly and each being provided with location means for locating a stored tool against angular movement;
    (iii) tool selector means comprising carriage means movably mounted on said support platform for preprogrammable movement in a generally horizontal plane over said tool storage means and tool gripper means carried by said carriage means for vertical movement between a low level and high level and being operable to grip a selected tool; and
  programmable means to cause said tool selector means to move to a position adjacent a selected tool storage aperture, to grip the selected tool therein and to withdraw it generally vertically from said storage means.

2. A machine tool including a workhead having a rotatable spindle for drivably engaging a tool of the type having a machining portion and a common base portion and a tool handling system for transferring tools between said drive spindle and tool storage means, said tool handling system including:
    (i) a generally horizontal support platform;
    (ii) tool storage means movably supported on said support platform and comprising a tool crate having an upper surface region defining a generally horizontal close-packed rectangular array of tool storage apertures each adapted to receive the base portion of a tool with its machining portion pointing upwardly and each being provided with location means for locating a stored tool against angular movement;
    (iii) tool selector means comprising carriage means movably mounted on said support platform for preprogrammable movement in a generally horizontal plane over said tool storage means and tool gripper means carried by said carriage means for vertical movement between a low level and high level and being operable to grip a selected tool,
    (iv) tool change means for receiving a tool at a transfer station and for moving it to as pickup station adjacent said drive spindle for being engaged thereby, and
  programmable means to cause said tool selector means to move to a position adjacent a selected tool storage aperture, to grip the selected tool therein, to withdraw it vertically thereafter from said storage means, to move it to said transfer station and to be moved by said tool change means to said pickup station.

3. A machine tool including a workhead having two horizontal drive spindles located one vertically above the other, each of said drive spindles being adapted to engage a tool of the type having a machining portion and a common base portion, and a tool handling system for transferring tools between said drive spindles and tool storage means, said tool handling system including:
   (i) a generally horizontal support platform;
   (ii) tool storage means movably supported on said support platform and compirising a tool crate having an upper surface region defining a generally horizontal close-packed rectangular array of tool storage apertures each adapted to receive the base portion or a tool with its machining portion pointing upwardly and each being provided with location means for locating a stored tool against angular movement;
   (iii) tool selector means comprising carriage means movably mounted on said support platform for preprogrammable movement in a generally horizontal plane over said tool storage means and tool gripper means carried by said carriage means for vertical movement between a low level and a high level and being operable to grip a selected tool;
   (iv) tool change means mounted for sliding movement with respect to said platform between a first position adjacent said tool storage means and a second position adjacent said workhead spindles, said tool change means including a bogey member supporting four clamping devices arranged insets of two pairs spaced one pair vertically above the other pair by a distance equal to the vertical separation of said workhead spindles, said bogey member being mounted for rotating through substantially 180° and being arranged such that when said tool gripper is at its high level it is at substantially the same level as one of said pairs of grippers; and
   (v) means for controlling the operation of said tool selector means and said tool change means.

4. A system as claimed in claim 1, wherein said support platform is adapted to support and locate at least four tool crates and includes means for moving a crate from one region to another on said platform.

5. A system as claimed in claim 1 wherein said tool gripper means includes a pair of arm members movable between a parallel position in which they grip a tool and a splayed position in which the tool is released.

6. A system as claimed in claim 5, wherein said arm members are of L-shaped form having gripping regions provided adjacent the free end of their shorter limbs.

7. A system as claimed in claim 5 wherein said tool gripper means is movable between a position in which a gripped tool is obtained with its axis directed generally vertically and a position in which said tool is oriented with its axis directed generally horizontally.

* * * * *